March 29, 1932.   G. W. POPPE   1,851,061

PROCESS AND MACHINE FOR MAKING ENVELOPES

Filed Feb. 2, 1931    8 Sheets-Sheet 2

INVENTOR
GEORGE W. POPPE
ATTORNEY

March 29, 1932.  G. W. POPPE  1,851,061
PROCESS AND MACHINE FOR MAKING ENVELOPES
Filed Feb. 2, 1931   8 Sheets-Sheet 4

INVENTOR
GEORGE W. POPPE
BY Newell & Spencer
ATTORNEYS

March 29, 1932.    G. W. POPPE    1,851,061
PROCESS AND MACHINE FOR MAKING ENVELOPES
Filed Feb. 2, 1931    8 Sheets-Sheet 5

INVENTOR
GEORGE W. POPPE
ATTORNEYS

March 29, 1932. G. W. POPPE 1,851,061
PROCESS AND MACHINE FOR MAKING ENVELOPES
Filed Feb. 2, 1931 8 Sheets-Sheet 7

March 29, 1932. G. W. POPPE 1,851,061
PROCESS AND MACHINE FOR MAKING ENVELOPES
Filed Feb. 2, 1931 8 Sheets-Sheet 8

INVENTOR
GEORGE W. POPPE
BY
ATTORNEYS

Patented Mar. 29, 1932

1,851,061

UNITED STATES PATENT OFFICE

GEORGE W. POPPE, OF BROOKLYN, NEW YORK, ASSIGNOR TO EQUITABLE PAPER BAG CO. INC., OF BROOKLYN, NEW YORK, A CORPORATION OF NEW YORK

PROCESS AND MACHINE FOR MAKING ENVELOPES

Application filed February 2, 1931. Serial No. 512,779.

This invention relates to a process and machine for making envelopes and one of the objects of the invention is to produce envelopes more rapidly. A further object is the production of envelopes on machines of less expensive construction than have heretofore been employed for this purpose.

In attaining these ends a feature of the process as practised in the preferred manner consists in making use of a bag tube which is formed in known manner and chopping out one wall of the tube as determined by cuts in the edge of the tube adjacent the folds and then severing the other wall along a line which intersects the cuts.

The process in a modified form consists in making preliminary cuts in a web of paper, said cuts being spaced from the edges thereof, cutting out portions near the margin and subsequently folding and pasting the web to form a bag tube and then severing the lower wall of the tube along a line which intersects the first cuts.

A further feature of the invention relates to a machine for carrying out my improved processes, such machine being of well-known type for producing paper bags but having such changes therein as adapt it to the production of envelopes.

Various other features and advantages will be apparent from the following detailed description and claims when considered in connection with the accompanying drawings in which—

In the practical art a distinction is made between what are known as bags and what are known as envelopes due in general not only to the characteristics of the articles produced but also to the process and machines for making them. Envelopes, in the practical art, are formed in such a way that the flaps closing the envelope are a continuation of the web from which the envelope is formed and both flaps fold over on the same side of the completed article.

Paper bags, on the other hand, as known in the practical art, are formed by folding a web of paper longitudinally to form a tube-like structure which is severed into predetermined lengths to form a bag. The tube is so cut or "chopped" as it is technically known in the art, that one flap is a prolongation of one wall of the bag tube while the other flap is a prolongation of the other wall. In a bag so made, therefore, the free or closing flap contains a portion of the seam due to the overlap of the web. For this reason and also because in bags the flaps do not fold over on the same side, envelopes are generally preferred.

By the processes and machine heretofore known, as far as I am aware, envelopes have not been, and cannot be, produced with anything like the speed that is possible when producing bags by known process.

By the process and machine of the present invention in its preferred form, I am enabled to produce envelopes with substantially the same speed as bags of corresponding size.

Furthermore, I am enabled to produce an envelope on the ordinary bag machine by slight modifications in the structure thereof and since envelope machines as at present constructed cost something like twice as much as bag machines, my invention furthermore results in a great saving in the original investment.

Before describing the parts more particularly concerned with the present invention, a brief mention will be made of the more important parts of a known bag machine, which machine is modified in a manner to be hereinafter described to enable it to carry out the present invention.

Figures 2, 3:
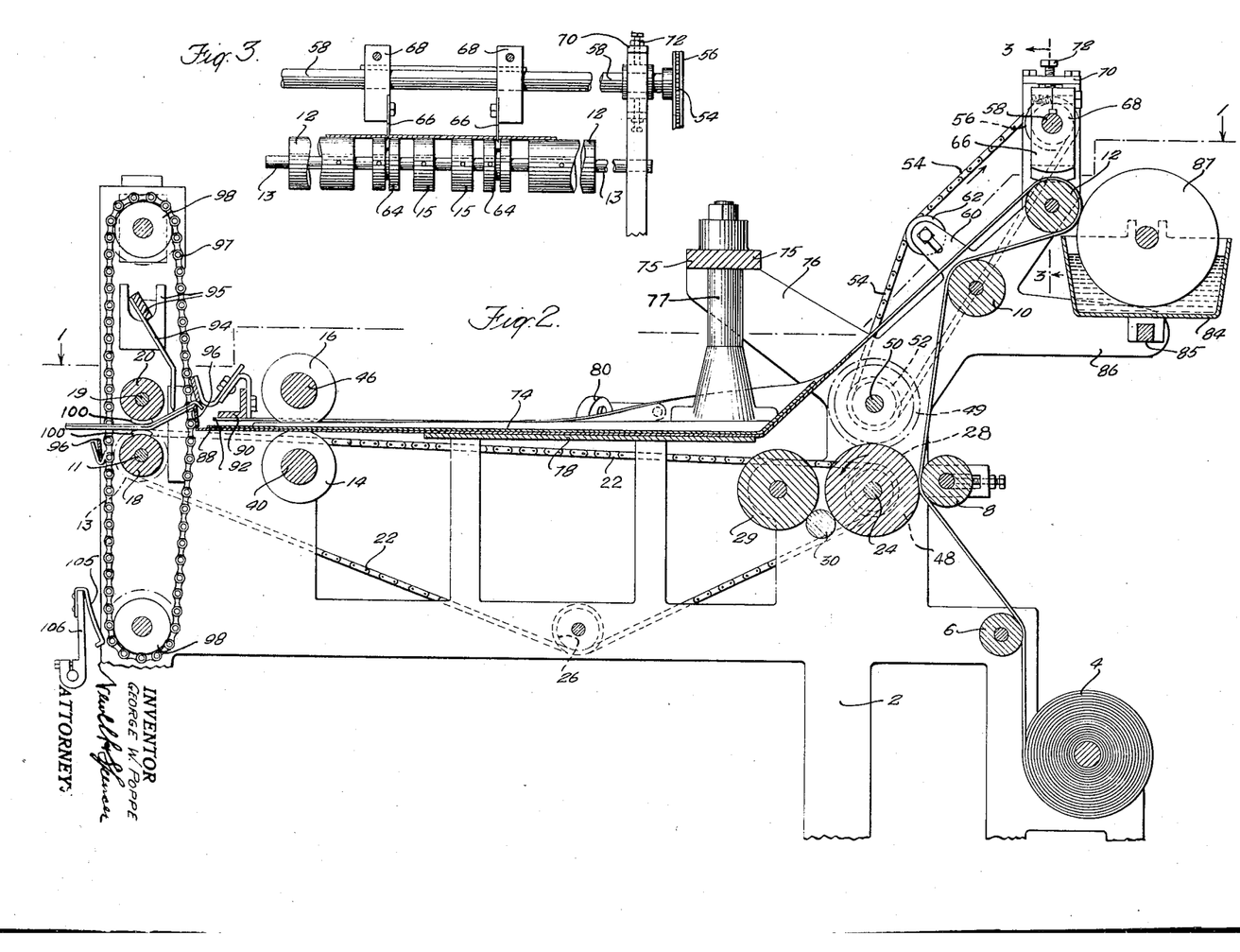
Figure 2 is a section substantially along the line 2—2 of Figure 1.
Figure 3 is a section on the line 3—3 of Figure 2.

Referring to Figure 2, there is a supporting frame work 2 and running transversely between the side members thereof are a number of shafts for operating the various mechanisms all of which are suitably driven and properly timed.

The paper is supplied from a roll 4 and passes about guide rollers 6, 8 and 10 and about a reversing roller 12 where the direction of motion is reversed, thence downwardly under a former and between feed rollers 14 and 16, thence to the so-called pinch bars 18 and 20 which momentarily retard it, while suitably arranged chopping knives sever the web transversely into bag lengths. The bags then pass on to folding and pasting mechanism, not shown in the present case, where the bottom flap of the bag is folded and pasted.

The power for operating the machine may be supplied in any well-known manner as by countershaft or by a motor. In the present illustration, Figure 1, I have shown a motor 3 which drives a pulley 5 connected by a belt 7 to a pulley 9 on a shaft 11 of the lower pinch bar 18. The shaft 11 also carries a gear 13 meshing with a gear 15 which is connected with the mechanism for folding and pasting the bottom of the bags.

Figures 1, 31, 32, 33:
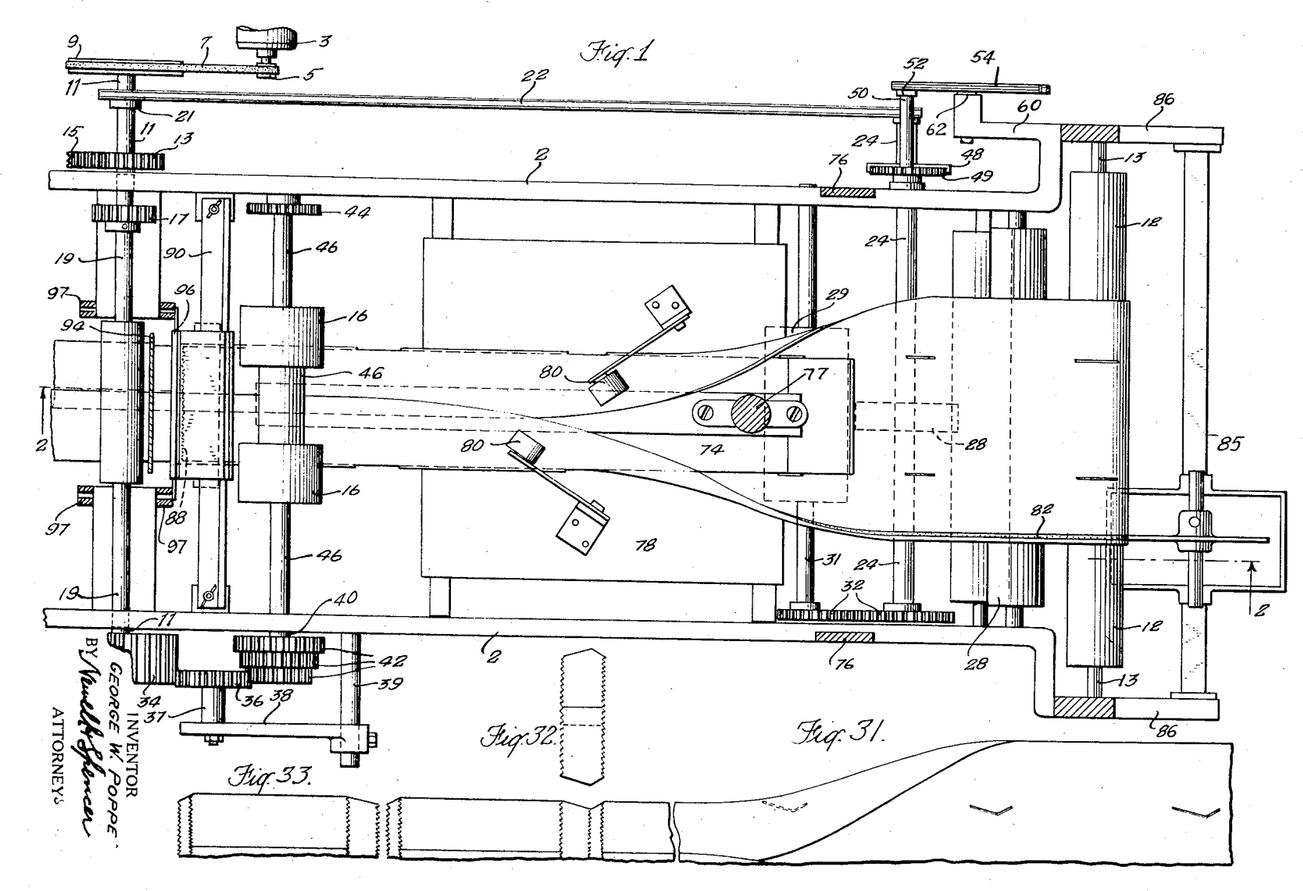
Figure 1 is a view partly in plan and partly in section, the section being taken along the line 1—1 of Figure 2.
Figure 31 shows a development similar to that shown in Figure 8 but in which the cuts are made with the die shown in Figure 25.
Figure 32 shows the shape of the cut-out portion of one envelope wall in this modification.
Figure 33 shows a completed detached envelope prior to closing of the lower flap.

Inside the frame of the machine the shaft 11 carries a gear which meshes with a similar gear 17 on a shaft 19 which supports the upper pinch bar. The pinch bars are thus geared together and make one rotation for each bag. The shaft 11 carries a sprocket 21 over which passes a sprocket chain 22 for transmitting power to a shaft 24 near the forward end of the machine, said shaft 24 being provided with a suitable sprocket fitting the chain 22 and there is also provided an idle sprocket 26 for taking up slack in the sprocket chain.

It is customary in a bag machine to provide means for printing on the web at bag length intervals and for this purpose the shaft 24 carries a printing cylinder 28. As the paper passes between the printing cylinder and the roller 8 it will receive an imprint. The roller 8 is shown as adjustable for allowing different diameter printing cylinders to be used for different length bags. An ink roller 29 and an ink transfer roller 30 are also indicated in Figure 2. The ink roller 29 is mounted on a shaft 31 driven by gearing 32 from the shaft 24 as shown in Figure 1.

Referring again to the shaft 11 there is provided a wide gear 34 on the end of this shaft with which meshes a gear 36 on a stub shaft 37 supported by an arm 38 on a stud 39 projecting from the side frame 2. The lower paper feed rollers 14 are supported on a shaft 40 which projects beyond the frame 2 and outside thereof it carries change gears 42. This shaft 40 also carries within the frame a gear which meshes with a similar gear 44 immediately above it, the latter carried by the shaft 46 which in turn supports the upper feed rollers 16. The gearing is such that the pinch bars make one rotation for each bag. By speeding up the feed rollers a longer bag may be made and the gear 36 and change gears 42 are provided to enable such change of speed.

The mechanism so far described is that which is found in the ordinary bag machine of a type which has been used for many years. It is to be noted that in addition to the mechanism described, these bag machines also provide means for folding the paper web, for applying the paste at the proper time and severing the bag tube, but since some of these mechanisms are modified in order to enable the present invention to be carried out, their detailed description has been consequently deferred.

In the preferred form of my process, as carried out in the machine illustrated in Figures 1 to 8, the web of paper is folded and pasted and then the upper wall of the tube thus formed is severed at two places by transverse cuts which meet the ends of slits or cuts made in the web. The lower wall is then severed along a line which intersects the cuts. These cuts in the web may be made as straight cuts in which case ordinary slitter knives may be used or they may be angular in which latter case a die would be used. For properly operating and timing the slitter knives or dies according to whether the one or the other is used, the following mechanism is provided.

The shaft 24 carries a gear 48 which meshes with a gear 49 on a stud shaft 50 whose outer end is suitably supported by a bracket extending from the side frame 2. The outer end of the shaft 50 carries a small sprocket wheel 52 which drives a sprocket chain 54 which passes about a sprocket wheel 56 on a shaft 58 (see Figure 3). A slotted arm 60, formed as a part of the upwardly extended portion of one of the side frames 2, supports an idler sprocket wheel 62 which is adjustable to take up slack in the sprocket chain 54.

The roller 12 for reversing direction of the feeding of the paper web is in reality a composite roller as shown more clearly in Figure 3, said roller consisting of two end sections adjustable along the supporting shaft 13. The shaft also carries two adjustable rollers 64 which are circumferentially grooved to receive the slitter knives 66 carried by members 68 adjustable along the shaft 58. Between the rollers 68 are rollers 15 which serve merely to support the paper near its central portions. The shaft 58 is adapted to be inserted in slots in the side frames of the machine which are extended upwardly to a suitable extent for thus supporting said shaft. A plate 70, secured by screws, holds the shaft in place and set screws 72 are also provided to adjust the shaft the proper distance from the composite roller 12 to adapt the slitter knives to bags of different lengths. The gearing from the shaft 24 to the shaft 56 is so proportioned that said shaft, and hence the slitter knives 66, make one rotation for each envelope to be made.

The paper web is pulled along by the feed rollers 14 and 16 and the cuts or slits shown at c, Figure 1, are made in the web, preferably at the time it passes over the roller.

The web then passes down under a former 74 and the web is folded over on to it.

Figure 13:
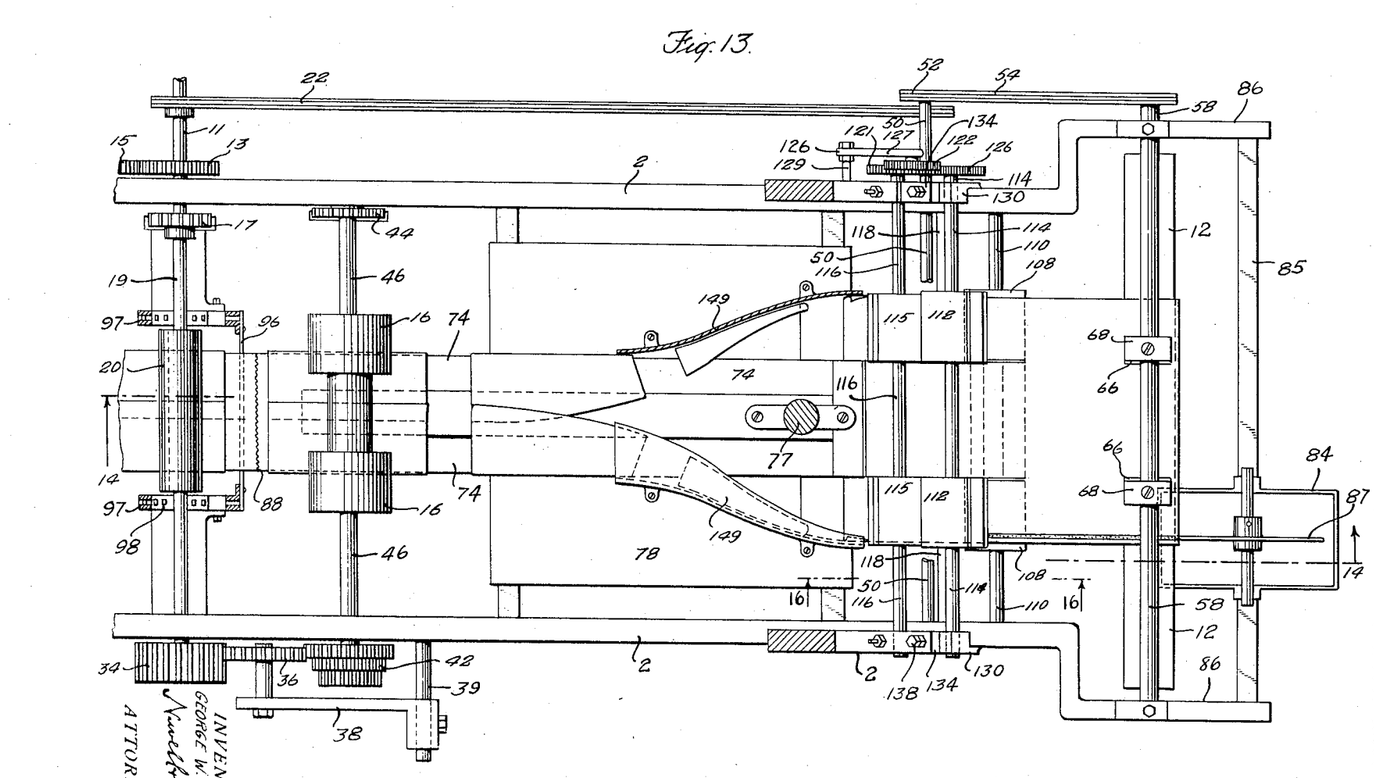
Figure 13 is a plan view similar to Figure 1 but showing a somewhat modified construction whereby cuts are made in the side of the web prior to the folding thereof.
Figures 13A, 14, 15, 25:
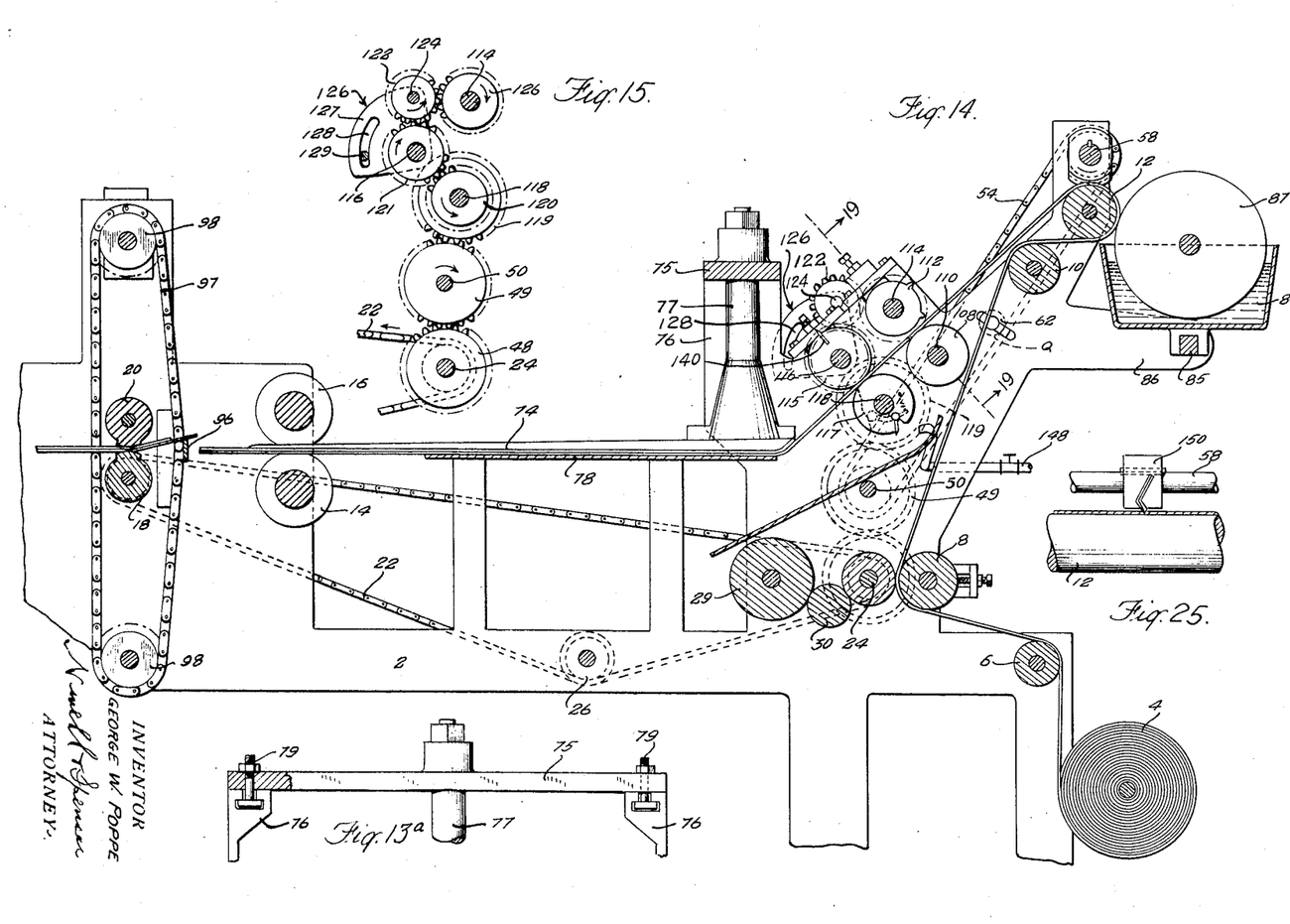
Figure 13a is a detail showing the support for the former.
Figure 14 is a section on the line 14—14 of Figure 13.
Figure 15 is a diagrammatic view of the transmission gearing.
Figure 25 is a detail of a different form of cutter.

The former 74 is supported from a bar 75 carried by upwardly extending side pieces 76, Figures 1 and 13a, one of these pieces extending upwardly from each side frame. The former is supported at the center of the bar 75 and is carried by a bar 77 which may be adjusted in the usual way so that the former is spaced from the bed plate 78 a distance sufficient to permit easy passage of the paper between the former and plate. The usual feed rollers 80 assist in giving the tube the proper shape as the web is folded over the former. In order that the former may be adjusted longitudinally, the side pieces 76 are slotted as shown in Figure 13a and set screws 79 pass through openings in the bar 75 which can be secured by said screws in different adjusted positions to vary the length of the flaps of the envelop that is being made as will be pointed out more particularly hereinafter.

A line of paste indicated at 82, Figure 1, is applied to the web as it passes over the roller 12. The usual paste pot 84 is supported by a shaft 85 which itself is carried by arms 86 extending rearwardly from the side frame plates of the machine. A disc 87 dips into the paste pot and makes contact with the paper as is usual in machines of this character.

By the process and machine described in my application Serial No. 316,462, filed November 1, 1928, bags having a long closing flap similar to envelope flaps are made by preliminarily slitting a web in a manner similar to that above described and subsequently severing both walls of the bag tube along lines which meet the ends of the slits. By this method I produce a bag having a long closing flap, but this flap contains the seam which has been made as an incident to the formation of the bag tube. Furthermore, the flaps fold in opposite directions so that the resulting article is not an envelope in the strict sense and has been designated in said application, a "bag-envelope".

By the present invention, I produce a true envelope having both flaps foldable on the same side as the seam, leaving the reverse side of the bag entirely free for printing thereon of any desired matter.

In the preferred form of the invention herein disclosed, I chop out a small section of the upper wall of the tube, that is, the wall containing the pasted seam, and in order to do this an additional knife is provided.

The former 74 is, as usual, provided with a serrated forward edge indicated at 88, Figure 2, and shown in dotted lines in Figure 1. A piece of angle iron 90 extends transversely of the machine as shown in Figures 1 and 2 and supports another knife 92, also preferably having a serrated edge. In addition to these two usual cutting edges, I provide a third knife or cutting edge 94 supported by a bracket 95 carried by the side frames.

As is usual in machines of this character, there is provided what is known in the art as a striker bar. This bar is shown at 96 as carried by sprocket chains 97 driven by upper and lower sprocket wheels 98 suitably supported and driven from the motor 3 by suitable gearing (not shown). The timing is such, however, that the striker bar operates once for each bag or envelope to be made. In the form shown, two of these striker bars 96 are provided as shown in Figure 2.

The operation of the knives in severing the tube to subsequently produce an envelope is illustrated in the enlarged operative views, Figures 4 to 7.

Figure 4:
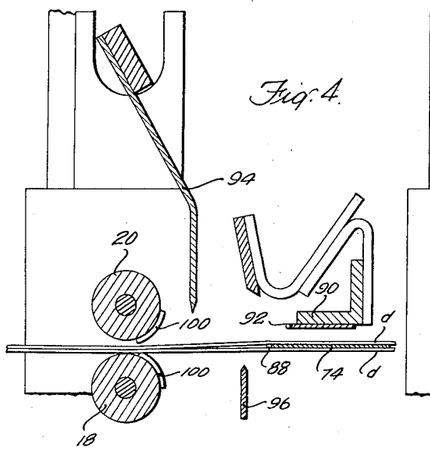
Figures 4 to 7 are enlarged views of the left-hand portion of the machine shown in Figure 2 and illustrate the successive steps in chopping or severing the bag tube walls.

Referring to Figure 4, the tube is indicated at $d$ and is shown with the former 74 extending between its walls. Comparing this figure with Figure 2 it will be observed that at this stage in the formation of an envelope, the feed rollers 14 and 16 are acting upon the lower and upper walls of the bag, respectively, to feed it towards the left, as indicated in Figures 2 and 4. The pinch bars 18 and 20 for the larger portion of their revolution do not operate upon the tube. These bars, however, have segmental portions 100 of such circumferential extent that during a portion of their rotation the bag tube is pinched between them and thereby retarded for a very short interval to enable the tube to be severed by the so-called chopping mechanism. In the ordinary process of making paper bags, these pinch bars operate as above described and the striker bar 96 contacts with the under wall of the bag tube at the proper time and the bag is severed by the knives 88 and 92. The present invention, as already suggested, provides for the cutting out of a section in the upper wall of the tube and the additional knife 94 serves this purpose. Figure 4 shows the segments 100 of the pinch bars just about to retard the tube.

Figure 5:
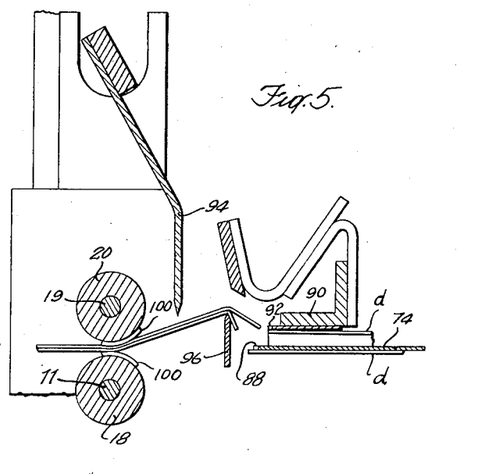

Figure 5 shows a position of the parts a fraction of a second later. In order to appreciate the approximate timing it may be helpful to mention the fact that ordinarily bags may be made at something like 400 to 500 per minute, depending upon the size of the bag. If it is assumed that 400 bags are produced a minute, this is at the rate of over 6 bags a second and since the pinch bars rotate once for each bag produced they will rotate over 6 times a second and hence the change in position of parts in Figure 5 is only a fraction of a second later than that represented in Figure 4. During this small interval of time there has been a slight retarding of the tube and hence a slack is produced in it. The striker bar 96 has moved from the Figure 4 position to the Figure 5 position and in so doing has caused the under wall of the tube to be severed by the edge 88 of the former and an instant later has caused the upper wall of the tube to be severed by the edge 92.

Figures 6, 7:
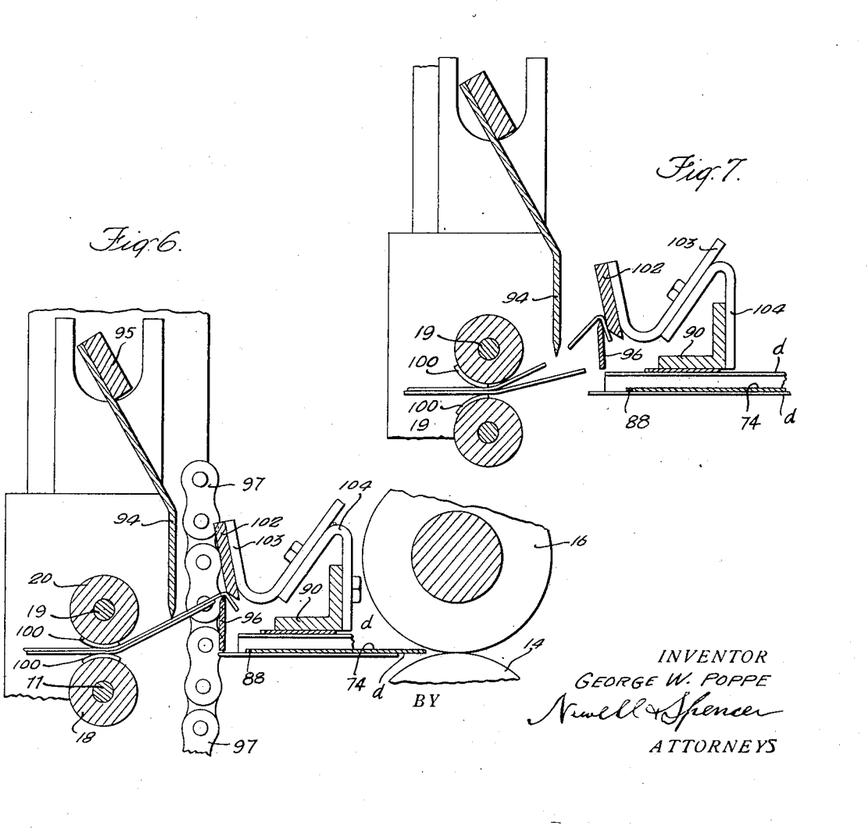

Figure 6 shows the position assumed by the parts a small fraction of a second later than that of Figure 5. The pinch bars have caused the cut-off tube section to be fed a short distance to the left and its motion, together with the further slight motion of the striker bar 96, has caused the lower wall of the tube to pass the edge of the striker bar while the upper wall of the tube still has its edge projecting over the striker bar. In the position of the parts here shown, it is to be noted that the right end wall of the lower wall is now free while the upper wall is held at one end by the pinch bars and at the other end by the striker bar 96, which at this instant jams the edge of the upper tube wall against a surface 102, preferably of leather, which is supported on a piece of spring steel 103 carried by another piece of spring steel 104 secured to the angle piece 90. It will also be noted that the upper wall of the tube is in contact with the edge of the knife 94.

Figure 7 shows the position of the parts a fraction of a second later than that shown in Figure 6 and here the section in the upper wall of the tube has been completely severed by the knife 94. The cut-out section or paper chip will, however, remain folded over the striker bar to be carried away and disposed of in any suitable manner. In Figure 2, I have indicated diagrammatically one way of disposing of these cut-out sections or paper chips. Here the downwardly moving striker bar 96 is shown as carrying a chip which is brushed off by the contact spring 105 carried by an arm 106. Other means of detaching the chip might, of course, be provided.

Figures 8, 9, 10, 11, 12, 12A, 21, 22, 23, 24:
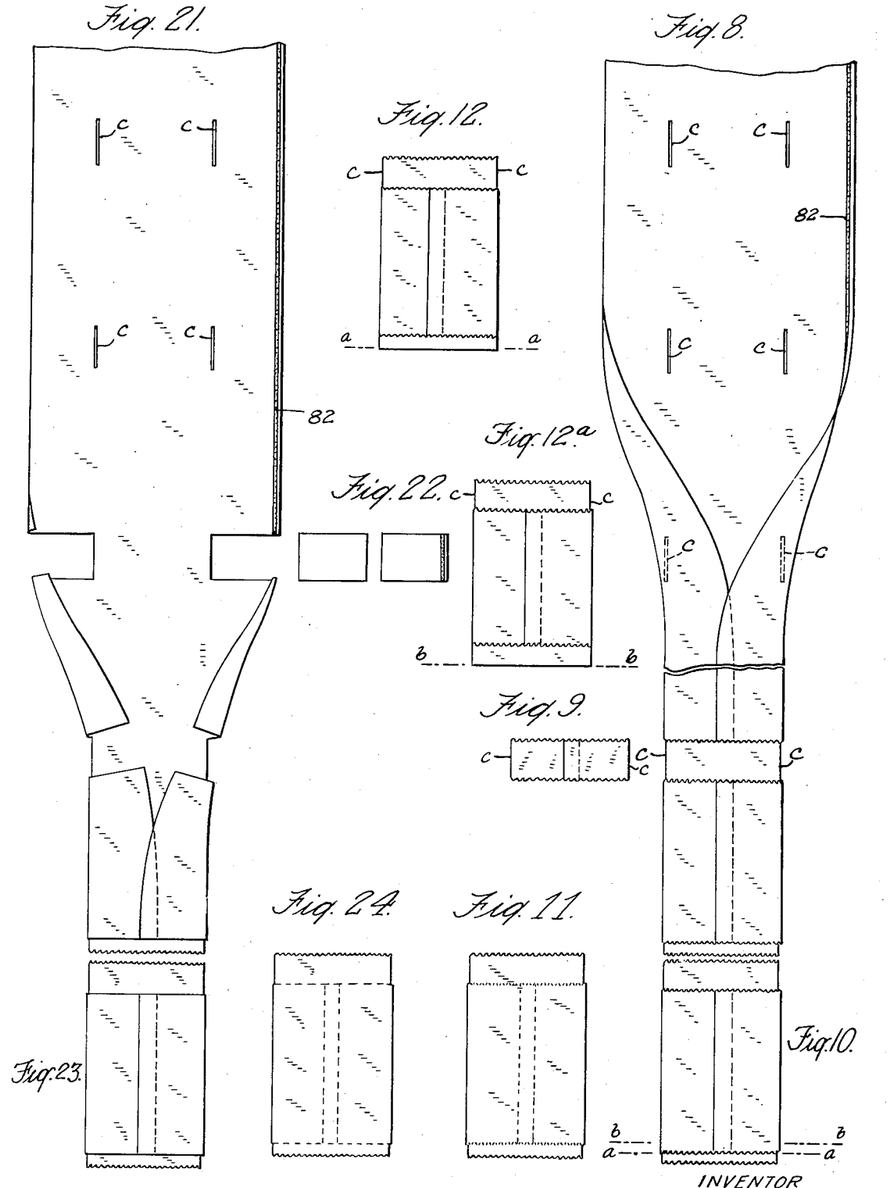
Figure 8 is a diagrammatic view illustrating the several steps in producing a finished envelope from the paper web.
Figure 9 is a detail of the chopped out portion of one wall of the tube.
Figure 10 illustrates the finished envelope but prior to the folding of the lower or closing flap.
Figure 11 is the reverse side of the envelope from that shown in Figure 10.
Figure 12 is a completed envelope in which the lower flap is folded along the line a—a, Figure 10.
Figure 12a is a completed envelope in which the lower flap is folded along the line b—b, Figure 10.
Figure 21 illustrates the development of an envelope from a paper web according to the process and machine of Figures 13 to 20.
Figure 22 shows the cut-out sections.
Figure 23, a detached envelope before pasting the lower flap.
Figure 24, the reverse side of the envelope shown in Figure 23.

To indicate the process diagrammatically, reference is made to Figure 8, which shows the development of an envelope from the web. In the upper portion of the figure, the web is shown with the slits $c$ formed therein and in the lower portion said web has been folded over and pasted. Figure 9 shows the chip which has been cut out by the operation just described. From this figure, taken in connection with Figures 4 to 7, it will be apparent that the knives 92 and 94 sever the upper wall of the tube along lines which intersect the ends of the slits or cuts c while the edge 88 of the former severs the lower wall of the tube along a line which intersects these cuts. Figure 10 shows the separated envelope but before the lower end is folded and pasted. This is done in the usual manner and the mechanism for forming this operation has not been shown. It may be folded either along the line a—a or along the line b—b. When folded along the line a—a the finished envelope has the appearance of Figure 12, while when folded along the line b—b it has the appearance of Figure 12a. For convenience of comparison it has been assumed that the lower flap is one inch long and that the distance between the lines a—a and b—b is ⅛ of an inch. Hence the envelope of Figure 12a is ⅛ of an inch shorter than the envelope of Figure 12. The advantage, however, of the Figure 12a construction is that the lower corners of the envelope are tightly sealed which for some uses may be an advantage. Figure 11 shows the reverse side of the envelope prior to folding and it will be noted that both the upper and lower flaps extend from the same tube wall and hence a true envelope is produced.

A characteristic feature of the process and machine just described may be said to be the formation of a tube having slits on opposite sides adjacent the folds of the tube and cutting one wall of the tube transversely along two lines to form upper and lower flaps of the finished envelope.

Mention has been made of the fact that the former 74 was capable of longitudinal adjustment. By reason of this adjustment the length of the bottom and top flaps of the envelope may be varied. As shown in Figure 10, the upper or closing flap is longer than the bottom flap. It is obvious that the varying of one will cause a variation of the other when the length of the slits c is the same.

In the machine which has been described for carrying out this process of forming envelopes, the paper web is cut prior to folding. It is not essential, however, to the practice of the process in its preferred form that these cuts be made in the web. They may be made in the tube after it has been formed as such. The only essential feature is that the cuts shall be present in the tube prior to the action thereon by the chopping knives. In my application Serial No. 502,722, filed December 16, 1930, I have shown and described mechanism for making cuts in the bag tube and mechanism similar to this can of course be used in producing the envelope of the present invention. I therefore do not desire that my claims shall be limited to the precise instrumentalities shown and described for making the cuts.

In Figures 13, 14 and subsequent figures, I have illustrated another process for producing envelopes and the characteristic feature of this modified process may be said to consist in cutting out portions of the web prior to folding as distinguished from cutting out a portion of the tube wall after the web has been folded to form the tube. While this may be viewed as a characteristic distinction there are other distinctions which will be better understood as the more detailed steps of the process are described as well as the mechanism whereby the process may be conveniently and automatically carried out.

The machine illustrated in Figures 13 and 14 contains a number of features similar to the machine illustrated in Figures 1 and 2. As in the previously described construction, the paper is fed from a roll 4 over the guide rollers 6, 8 and 10, and around a composite roller 12 which reverses the direction of paper feeding. There is also provided the feed rollers 14 and 16 and the pinch bars 18 and 20 which may be constructed precisely like similar parts described in connection with the first form of device. The shaft 11, Figure 13, may be driven from a motor such as shown in Figure 1 and the same speed changing mechanism including the wide gear 34, the swinging gear 36 and change gears 42 may be provided. Similarly, the shaft 24, Figure 14, is driven by the sprocket chain 22 passing over the idler 26. The shaft 24 also carries the gear 48 meshing with the gear 49 and a stub shaft 50 carrying a small sprocket wheel 52 for transmitting motion to the shaft 58 through the medium of a sprocket chain 54, as in the form of device described in Figures 1 and 2.

It will be noted, however, that the frame members 2 are somewhat differently shaped in Figure 14 from those shown in Figure 2, such change in shape being necessitated by reason of additional mechanism for carrying out the process in its modified form. It is also to be noted that the rollers 8 and 10 are somewhat differently disposed and the idler sprocket 62 is also differently arranged. The operation of the parts, however, is precisely the same. The shaft 58 is the same as the similarly numbered shaft shown in Figure 3 and carries the two knives 66 mounted in holders 68 for making preliminary slits in the paper web.

In the modified process now to be described, the web is notched at its opposite edges and the paper chips resulting from this notching are removed and disposed of. The mechanism for accomplishing this will now be described.

As the paper is fed from the composite roller 12 it passes between the hardened steel rollers 108 mounted loosely on a shaft 110, and a crushing roller or die 112 secured to a shaft 114. There is provided one of these dies 112 and a roller 108 on either side of the machine, so located that the cutting portions of the dies form notches in the side of the web as indicated in Figure 21. As here shown, the cutting edges of the dies are parallel and are spaced apart such a distance about the circumference 112 that the cuts in the web will meet the ends of the slits which have been formed by the knives 66 and consequently the paper chips which are the result of the action of the dies 112 will be shaped as indicated in Figure 22.

It is desirable to remove these chips so as not to interfere with the proper feeding and further operations on the paper and for this purpose tucker rolls 115 secured to a shaft 116 are provided and these cooperate with chip receiving rollers 117 secured to shaft 118.

It is essential that the dies 112, the tucker rollers 115 and the chip-receiving rollers 117 be driven in unison and for this purpose the gear 49 on the shaft 50, Figures 13 and 14, meshes with a gear 119 secured to the shaft 118 which shaft also has secured thereto a smaller gear 120 meshing with a gear 121 of the same size secured to the shaft 116. Since the tucker rolls 115 and the dies 112 must be driven in the same direction, motion is transmitted to the dies through an intermediate idler 122 mounted on a shaft 124, said idler meshing with a gear 126, secured to the shaft 114 for the purpose of permitting different size dies to be used and a different size gear 126 to correspond therewith. The idler 122 is mounted on a segment 126 pivoted about the shaft 116, said segment having a slot 128 through which a pin 129 passes and which pin may be screw-threaded and thereby secured into the side frame 2 as shown in Figure 13.

Figures 16, 17, 18, 18A, 19:
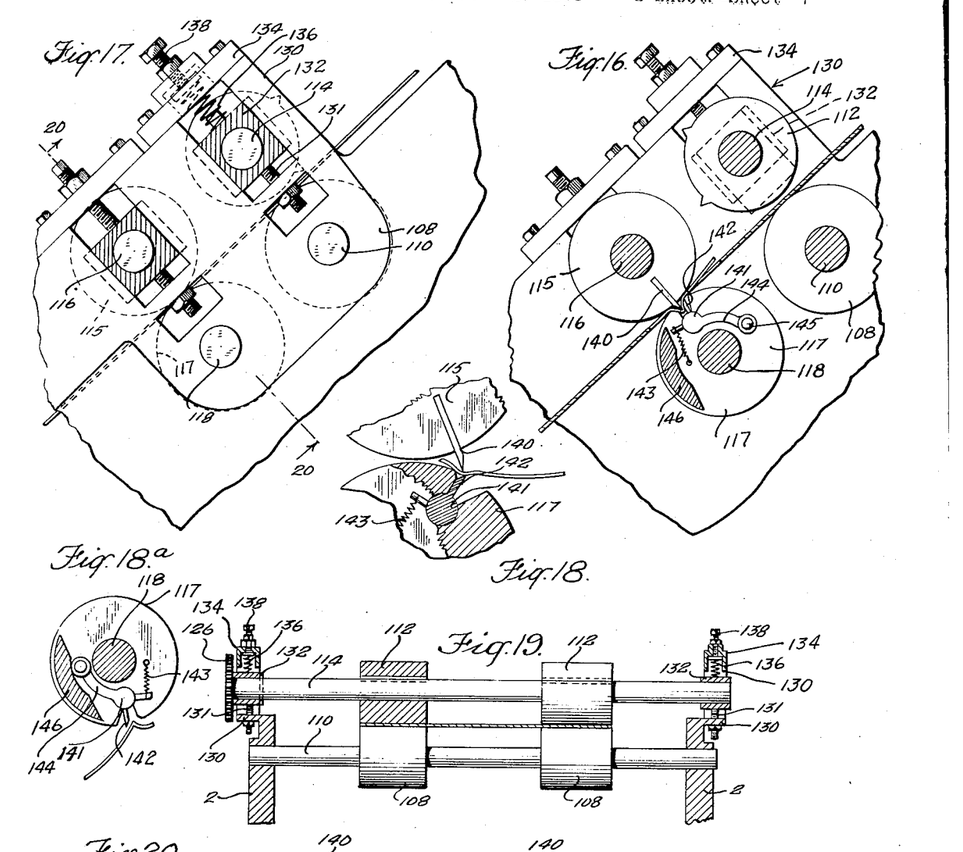
Figure 16 is a section taken on the line 16—16 of Figure 13.
Figure 17 is a side elevation of the parts shown in Figure 16.
Figures 18 and 18a are detail operative views.
Figure 19 is a section taken on the line 19—19 of Figure 14.

To permit the shaft 114 to be removed with its dies 112, the said shaft is supported in the frame in the manner indicated in Figures 17 and 19. A portion of the side frames 2 of the machine extends beyond the main portion and also outwardly, forming a bracket 130 and through these brackets pass set screws 131 which bear against the under side of sleeve bearing blocks 132 at each end of the shaft 114. The upwardly extending portions of the said frames are suitably notched to carry the blocks and a plate 134 extends across the top of the bracket to hold the shafts in place. Since the dies act with a crushing action on the paper and against the surface of the hardened steel roller 108, it is desirable that they be yieldingly supported and for this purpose springs 136 are interposed between said screws 138 carried by the plate 134 and the blocks 132. The set screws 131 are for the purpose of determining the extent to which the shaft 114 is permitted to move downwardly and this adjustment should be such that the dies cut through the paper but do not dig into the roller 108. As the dies wear or become shorter as the result of sharpening, the set screws 131 are adjusted accordingly. The roller 108 is loosely mounted and the dies tend to cause it to rotate so that different portions of its surface are presented to the dies.

Figure 20:
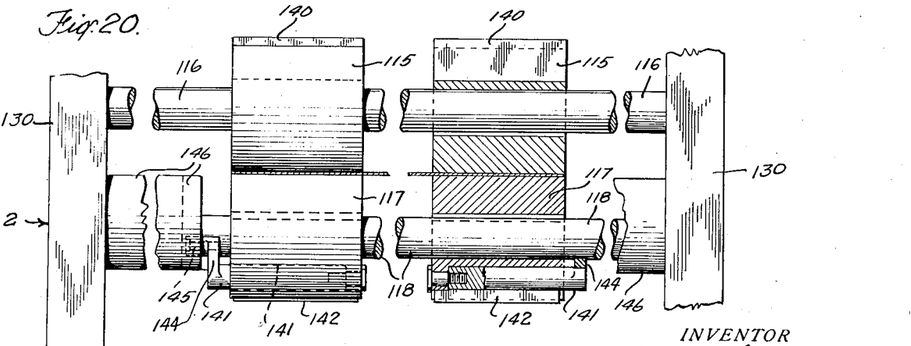
Figure 20 is a section on the line 20—20 of Figure 17.

Each tucker roll 115, Figure 20, carries a tucker blade 140 which acts at the proper time to engage the paper chip which has been cut out at the side of the paper web and tuck said chip into a clamp carried by the chip receiving roller 117. For this purpose the rollers 117 carry within them a small shaft 141 (see also Figure 20) and projecting radially from the shaft is a clamp 142 having a cam face. The shaft 141 is urged by a spring 143 to a position to close the clamp, but when the parts are positioned as shown in Figure 18, the clamp is forced open by the tucker blade 140 and the paper chip is inserted and held as indicated in Figure 16. The shaft 141 also carries an arm 144 provided with a roller 145 which engages a cam 146 when the roller 117 reaches the position shown in Figure 18a. The clamp is then released and the paper chip falls out.

To facilitate its more ready removal of the chips, a small air jet may be used and a conduit for this purpose is shown at 148, Figure 14. It is to be understood of course, that there is one of these clamps for each tucker blade as indicated in Figure 20.

After the paper web has been notched and the chips, shown in Figure 22, removed and disposed of as above described, the web is folded to form a tube as indicated in the lower portion of Figure 21 and also in Figure 13. The folding operation is facilitated by means of guides 149, Figure 13, supported from the bracket 75 which carries the former 74. At this stage of the process the tube is completely formed and there is a gap in the upper wall thereof. It only remains to sever the lower wall of the tube at the desired place to provide the top or free flap of the severed envelope and the closing flap or bottom flap for the next succeeding envelope. This severing may be performed in any desired manner but for economy and speed of operation I prefer to use the mechanism usually provided in paper bag machines and which consists of the edge 88 of the former plate which is serrated as is usual in this type of machine. As the tube passes to and into contact with the pinch bars, as shown in Figure 14, it is retarded. The striker bar 96 operates in a well known way to sever the lower wall of the tube and the detached envelope passes on to have its bottom flap folded over and pasted in the usual and well-known manner.

By adjusting the former as already described, the length of the envelope flap may be likewise varied in the envelope made as above described.

Figure 23 shows the envelope prior to the folding over and pasting operation, and Figure 24 shows the reverse side of this envelope in the same condition. It will be noted that Figures 11 and 24 are exactly alike, which indicates that the envelopes produced by the two different processes are identical in appearance.

In producing an envelope according to the preferred process, the development of which is indicated in Figure 8, and also in producing the envelope by the modified process whose development is shown in Figure 21, the slits in the web are shown as extending longitudinally of the web and they are also shown as straight. This results in an envelope whose flaps have parallel edges. A differently shaped flap may be produced by using dies for making these preliminary cuts in the web rather than slitter knives and in the carrying out of my invention it is my intention to use either one or the other as desired. In Figure 3 I have shown one arrangement whereby either form may be conveniently used. For this purpose the shaft 13 which carries the grooved discs 64 for receiving the slitter knives 66 also carries the rollers 12 which preferably are of hardened steel and which may be adjusted along the shaft 13 to so locate them that they will coincide with dies which may be secured to the shaft 58, one of said dies being indicated at 150, Figure 25.

In the making of the envelope as developed in Figure 21, the dies 112 have their cutting edges parallel. It is obvious, of course, that dies of other shapes may be used and in Figure 26 I have indicated more or less diagrammatically dies 112a which have their cutting edges set at an angle. The development of an envelope using the dies 150 and 112a is shown in Figure 27.

Figures 26, 27, 28, 29, 30, 34, 35:
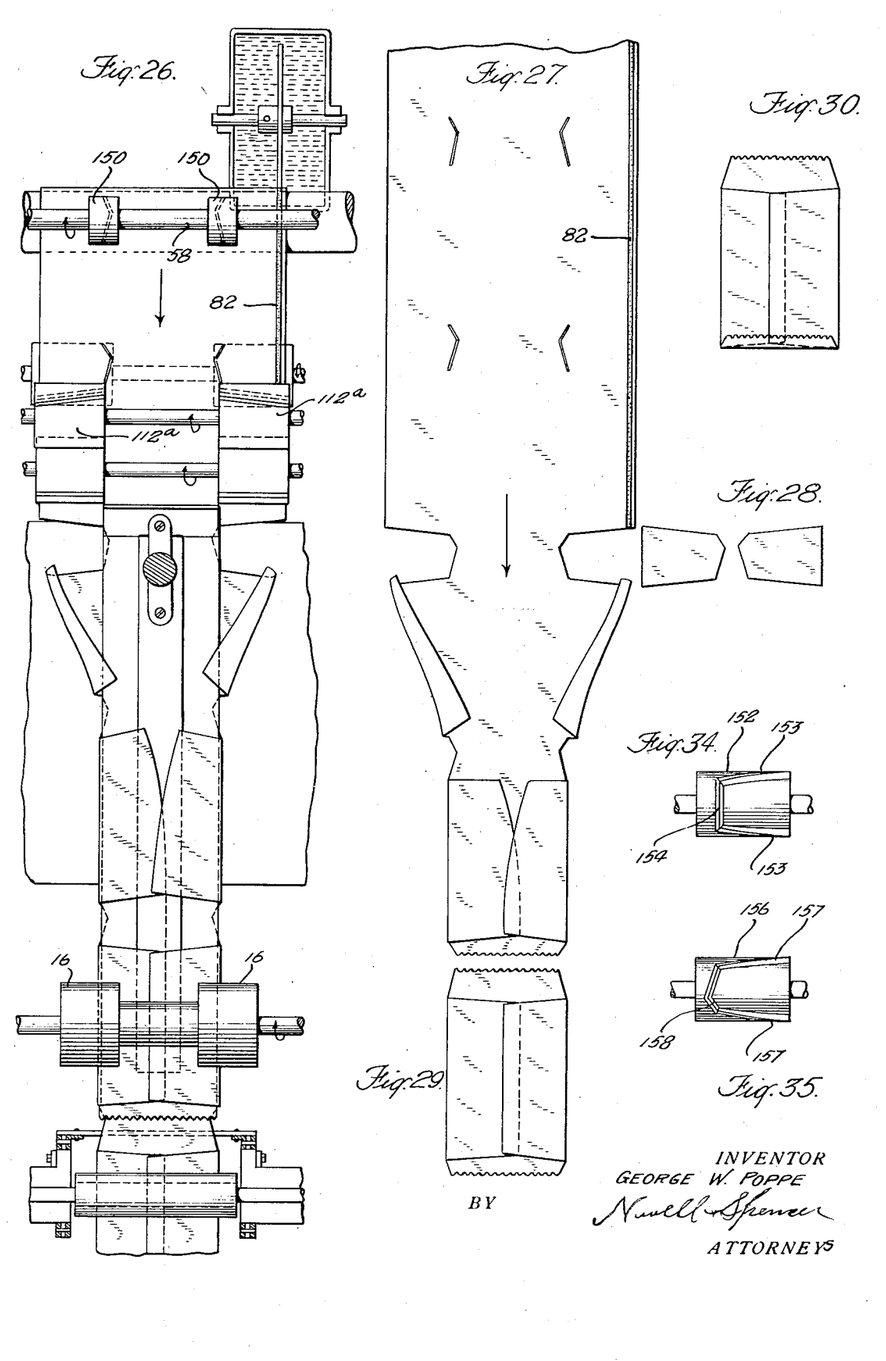
Figure 26 shows a portion of the machine and is similar to Figure 13 except that the cuts made in the paper web are made with dies as shown in Figure 25 instead of with slitting knives.
Figure 27 is a diagrammatic representation of the method of producing the envelope according to the machine and process of Figure 26.
Figure 28 shows the pieces which are cut out from the sides of the paper web.
Figure 29 shows the envelope after it has been completely severed from the tube.
Figure 30 shows the same after the lower flap has been folded up and pasted.
Figures 34 and 35 are details of other forms of die.

Figure 28 shows the shape of the paper chips which are removed from the edge of the paper web when dies of the character shown at 112a are used. The other mechanism is exactly the same as that described in connection with Figures 13 and 14 but it will be noted that the detached envelope, shown in Figure 29, differs from that shown in either Figures 11 or 24 in that the flaps are of different shape and the edges of the opening also slant towards the center.

Dies such as 150 may be used in producing an envelope according to the first described process and in Figures 31, 32, and 33 I have shown the development of an envelope according to this process but with the use of dies which make an angular cut instead of a straight cut. The chopped out portion of the upper wall of the tube is shaped like that shown in Figure 32. Figure 33 shows the detached envelope which somewhat resembles Figure 29 although not precisely, due to the fact that knives make a straight cut instead of a slanting cut such as is made by the dies 112a.

In making envelopes according to the process diagrammatically indicated in Figures 21 and 27, the web is shown as having been provided with slits or cuts which are made by either the use of slitter knives or dies and in the machine illustrated in Figures 2 and 13, these slitter knives or dies are carried by the shaft 58. Instead of performing the cutting of the web by two operations, such cutting may be done in a single operation and in Figures 34 and 35 I have shown dies suitably constructed for this purpose.

In Figure 34 the die 152 is shown as having tapering edges 153 and a straight end 154. A pair of dies of this sort may be used on the shaft 114 in place of the dies 112 or 112a or such dies may be used on the shaft 58.

When dies such as 152 are used, the length of the flaps of the envelope resulting from a web notched by such dies may be varied as already described by longitudinal adjustment of the former 74.

When, however, the dies shown in Figure 35 are used, the lower wall of the tube must be severed along a line which meets the apex of the cuts formed by the end edges 158 of the dies. In order to vary the length of the envelope flaps, therefore, it is necessary to substitute differently shaped dies.

It is obvious from the description that the elements of the machine may be combined in various ways to produce quite a variety of envelope forms and, as far as I am aware, I believe I am the first to adapt a bag machine to the making of envelopes.

What I claim is:—

1. The process of forming envelopes from a tube having upper and lower walls and cuts on opposite sides of the tube which consists in severing both walls of the tube, the upper wall along lines which meet the ends of the cuts and the lower wall along a line which intersects the cuts.

2. The process of forming envelopes from folded tube having a seam in one wall thereof, said tube also having cuts on opposite sides adjacent the folds thereof, which consists in severing the wall of the tube which contains the seam along lines which meet the ends of the cuts and severing the other wall of the tube along a line which intersects the cuts.

3. That step in the process of making an envelope from a folded and pasted tube having upper and lower walls and cuts on opposite sides of the tube adjacent the folds thereof, which consists in making transverse cuts in the upper wall of the tube, said transverse cuts being separated a distance equal to the projection of the cuts.

4. That step in the process of making an envelope from a tube having a seam in one wall thereof and having cuts on opposite sides adjacent the folds, which consists in severing the wall containing the seam along lines which meet the ends of the cuts.

5. The process of forming envelopes from a web of paper which consists in making cuts in the web spaced from the edges thereof, folding the web to form a bag tube, and severing both walls of the tube, one wall along lines which meet the ends of the cuts and the other wall along a line which intersects the cuts.

6. The process of forming envelopes from a web of paper which consists in making cuts in the web spaced from the edges thereof, folding the web to form a bag tube having a seam in one wall thereof, and severing both walls of the tube, the wall having the seam along lines which intersect the ends of the cuts, and the other wall along a line which intersects the cuts.

7. The process of making envelopes from a web of paper which consists in making cuts in the web spaced from the edges thereof, making cuts in the web extending from the ends of each of the first cuts to the adjacent margin of the web, folding the web to form a tube and cutting one wall of the tube transversely along a line which intersects the first cuts.

8. In a machine for making envelopes, the combination with a former having a cutting edge and means for continuously feeding paper along said former and for folding the paper about said former to form a tube; of means for cutting notches in the edges of the web prior to folding it about the former and means for bringing one wall of the tube into severing contact with said cutting edge.

9. In a machine for making envelopes, the combination with a former having a cutting edge and means for continuously feeding paper along said former and for folding the paper about said former to form a tube; of means for making cuts in the web spaced from the edges thereof, means for making cuts in the web extending from the ends of the first-mentioned cuts, both series of cuts being made prior to folding the web about the former and means for bringing one wall of the tube into severing contact with the cutting edge of the former.

10. In a machine for making envelopes, the combination with a former having a cutting edge and means for continuously feeding paper along said former and for folding the paper about said former to form a tube; of two cutting edges spaced apart and located adjacent the cutting edge of the former and means for bringing the one tube wall into severing contact with said two cutting edges.

11. In a machine for making envelopes, the combination with a former having a cutting edge and means for continuously feeding paper along said former and for folding the paper about said former to form a tube; of two cutting edges spaced apart and located adjacent the cutting edge of the former and means for bringing one tube wall into severing contact with said two cutting edges and the other tube wall into severing contact with the cutting edge of the former.

12. In a machine for making envelopes, the combination with a former having a cutting edge and means for wrapping a web of paper about the former to produce a tube; a cutting edge spaced from the cutting edge of the former and adapted to act in conjunction with the former to sever the upper and lower tube walls; of an auxiliary cutting edge spaced from said second-mentioned cutting edge and adapted to also sever the upper wall of the tube.

Signed at Brooklyn, N. Y., this 27th day of January, 1931.

GEORGE W. POPPE.